Aug. 23, 1960  E. DASH  2,950,379
STUD WELDING MEANS AND METHOD
Filed July 30, 1957  2 Sheets-Sheet 1
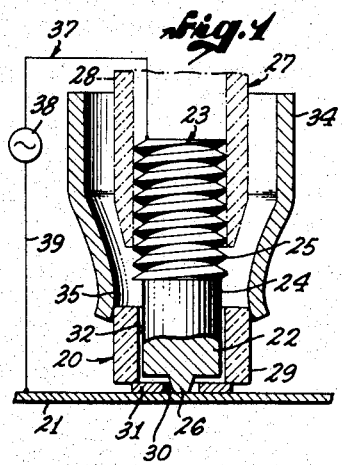
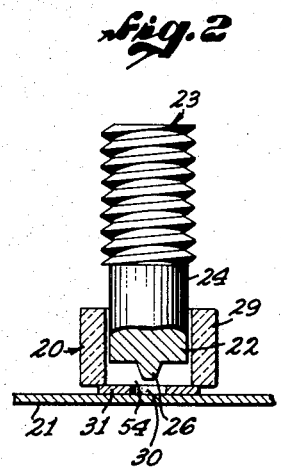
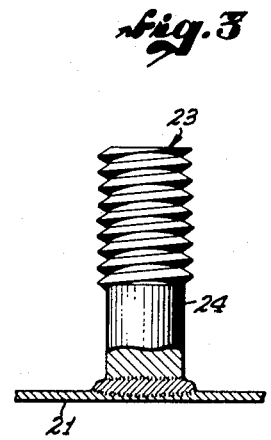
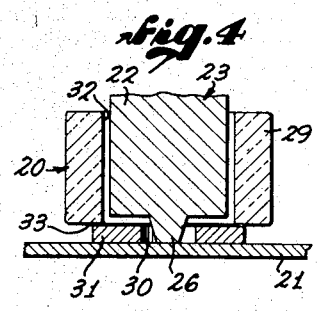
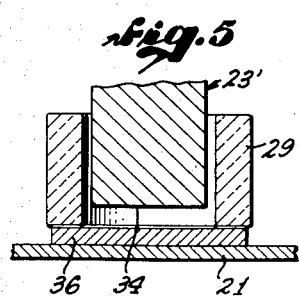
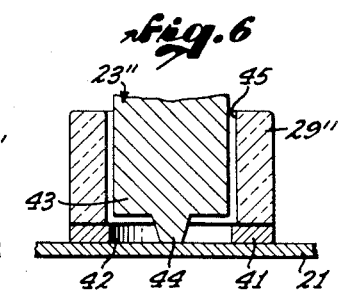
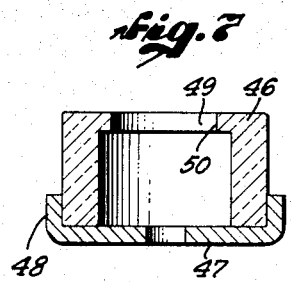
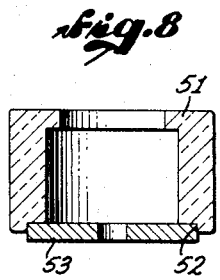
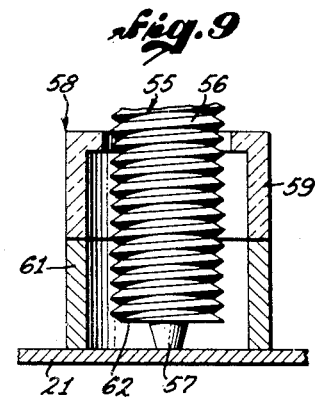
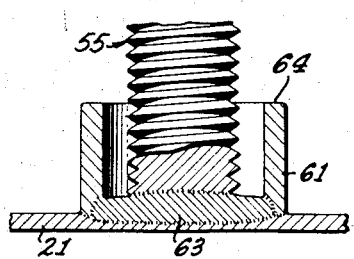
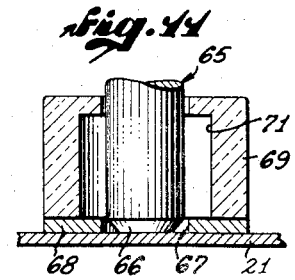
EDWARD DASH,
INVENTOR.
HERZIG & JESSUP,
BY  ATTORNEYS.
Warren T. Jessup Aug. 23, 1960 E. DASH 2,950,379
STUD WELDING MEANS AND METHOD
Filed July 30, 1957 2 Sheets-Sheet 2
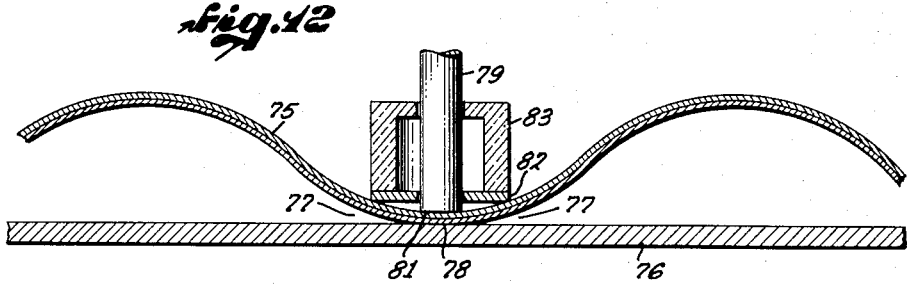
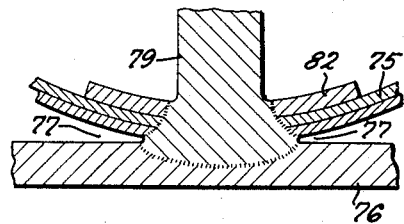
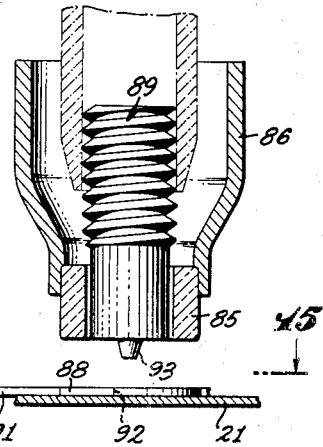
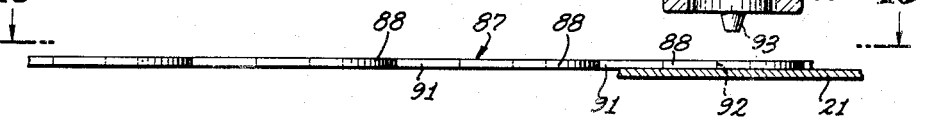
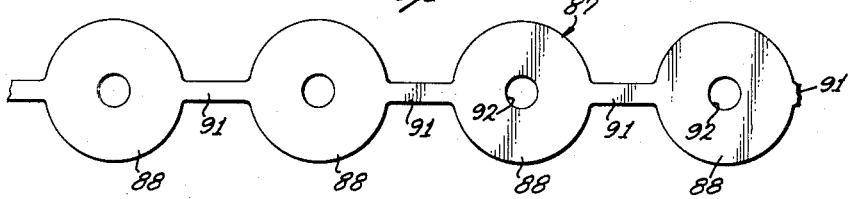
EDWARD DASH,
INVENTOR.
HERZIG & JESSUP,
BY ATTORNEYS.
Warren T. Jessup United States Patent Office 2,950,379
Patented Aug. 23, 1960

2,950,379

STUD WELDING MEANS AND METHOD

Edward Dash, 1540 Seabright Ave., Long Beach, Calif.

Filed July 30, 1957, Ser. No. 675,125

19 Claims. (Cl. 219—99)

This invention relates to a stud welding means and method and particularly to a metal faced welding ferrule—more specifically to a combination of a sleeve of refractory material with a metal member attached or adjacent to the sleeve for use in welding a stud to a relatively thin metal sheet.

The use of electric arc welding process for studs has been hitherto limited because of the lower limitation of the plate or sheet thickness for welding of a given stud diameter. For example, as indicated in the "Welding Handbook of the American Welding Society" (third edition), page 294, the minimum recommended plate thickness to which a 3/8 inch diameter stud can be welded is 0.063 inch.

This limitation has been established because of the prior stud welding means and methods by which the heat generated in the welding area has been dissipated in the plate. If an excess of heat is concentrated at the weld zone, the stud "burns through" the metal sheet marring the opposite side or even forming a hole through the sheet. Since a larger diameter stud requires more heat, it is apparent that a point will be reached for a particular diameter stud when a given minimum thickness of a plate has reached a maximum absorption of heat, and a "burn-through" occurs. Even when a heat dissipating bar, of copper material or the like, is used to back up a sheet, especially one of a thin gauge material, "burn-through" is common, and the lower aforementioned limitation of stud size relative to plate size is not materially improved.

Another disadvantage of present methods employed in this art, is that when attempting to stud weld a sheet material having a protective coating thereon, such as galvanized metal, or the like, the stud welds are characterized by low strength. Moreover, the heat required to establish a welding temperature frequently destroys the coating in a large area surrounding the weld area. The resulting product is therefore often unusable and subject to rejection.

It is therefore an object of this invention to provide a metal-faced ferrule which can be used to fuse a stud to a thin gauge metal without the danger of a "burn-through" in all welding positions (i.e., flat, vertical, overhead) and without the use of a back-up heat dissipating bar.

It is another object of this invention to provide a new and improved ferrule which can be used in welding a stud to a thin gauge protective coated metal, obtaining a stud weld of high strength without excessive damage of the protective coating.

A further object of this invention is to provide a new and improved welding ferrule which can be used in welding a plurality of thin gauge members, either flat or corrugated.

A still further object of this invention is to provide a stud welding ferrule of the character described, which does not require accurate settings in the use thereof to avoid "burn-through" of the sheet member, and which is effective within a wide range of heat without such "burn-through."

Another object of this invention is to provide a ferrule, which when used in a stud welding process, forms a larger welded cross sectional area on a given thin gauge member with a given sized stud.

Yet another object of this invention is to provide a new and improved metal-faced ferrule which can be used to weld a stud of a given size to a thinner gauge sheet, and a larger diameter stud to a given thin gauge sheet, than has been hitherto possible.

An object of this invention is to provide a new and improved ferrule of the character described which can be used to weld studs of small diameters to large members.

Another object of this invention is to provide a new and improved metal-faced ferrule which contributes to the final stud weld material different from or similar to either the stud material used, or the base metal being stud welded; and contributes brazing metal of lower melting temperature than either the stud or base metal.

Another object of this invention is to provide a new and improved metal-faced ferrule which may be combined with a conventional stud to result in a shoulder stud after welding.

It is a general object of this invention to provide a new and improved combination of a welding ferrule with a welding member which provides means to dissipate or absorb heat from the weld zone in the art of welding a stud to a thin sheet member, to provide an improved welding of such members, and which thereby overcomes disadvantages of prior methods and devices heretofore intended to accomplish generally similar purposes.

These and other objects of this invention will be more readily apparent to one skilled in the art from the following detailed description of the drawings and appended claims.

In the drawings:

Fig. 1 is a vertical sectional view, with parts shown in elevation, showing a welding stud and welding ferrule with metal facing juxtaposed to a metal sheet prior to the application of an electric current;

Fig. 2 is a vertical sectional view similar to Fig. 1, illustrating the position of the stud relative to the sheet metal, during the period of time when the electric current is flowing;

Fig. 3 is a vertical sectional view similar to Figs. 1 and 2, illustrating the stud after being welded to the metal sheet;

Fig. 4 is an enlarged fragmentary vertical sectional view of the embodiment shown in Fig. 1;

Fig. 5 is an enlarged fragmentary vertical sectional view similar to Fig. 4, illustrating another embodiment of this invention;

Fig. 6 is an enlarged vertical sectional view similar to Fig. 4, illustrating a third embodiment of this invention;

Fig. 7 is a vertical sectional view of a ferrule according to this invention, illustrating a modified means for securing the metal member to the sleeve member;

Fig. 8 is a vertical sectional view similar to Fig. 7 illustrating another modified means for securing the metal member to the sleeve member;

Fig. 9 is an enlarged vertical sectional view, with parts in elevation, showing a further modified form of metal member, as used in forming a shouldered weld stud;

Fig. 10 is a vertical sectional view, similar to Fig. 9, illustrating the embodiment shown in Fig. 9 after welding;

Fig. 11 is a vertical sectional view, illustrating a modified form of stud and metal member according to this invention;

Fig. 12 is a vertical sectional view, illustrating the adaptation of a ferrule according to this invention, used in welding a stud to a curved or otherwise formed metal sheet;

Fig. 13 is an enlarged fragmentary vertical sectional view showing the weld zone obtained after welding of the embodiment shown in Fig. 12;

Fig. 14 is a vertical sectional view illustrating another modified form of a metal member which may be used in this invention; and Fig. 15 is an enlarged plan view, in elevation, as seen on a line 15—15 of Fig. 14.

Referring to the drawings, and more particularly to Figs. 1 through 4, there is shown by way of illustration, but not of limitation, a preferred embodiment of a metal faced ferrule 20, placed against a metal sheet 21, and encircling the lower end 22 of a stud member 23.

The stud 23 may be of any desired form such as the cylindrical body 24 illustrated, and may include threads 25 at the upper end thereof. A protrusion 26 of reduced diameter relative to the body 24, depends from the lower end 22, and is preferably located centrally thereof; the purpose of this protrusion will be hereinafter explained.

A welding gun, of which a portion is indicated generally by the numeral 27, and which will not be further described in this specification, generally includes a chuck means 28 which may be used to support the stud 23.

The ferrule 20 comprises a sleeve 29, of any suitable refractory material, and a metal member or facing 31, which is fixed to the bottom edge thereof. A bore or passageway 32 of the sleeve 29 is preferably slightly larger than the lower end 22 of the stud 23. The bore 32, capped by the facing 31, defines a welding chamber. The sleeve 29 provides means for shielding the area surrounding the weld zone from atmospheric gases and confines and prevents spattering of the molten metal of the weld during the welding operation. The periphery of the facing 31 extends beyond the welding chamber by virtue of the placement of the facing beneath the sleeve 29.

The metal member 31 provides welding material to fuse the stud 23 to the metal sheet 21, and may be of any suitable metal such as steel, or the like, and may be formed of a copper alloy which has a lower melting point and a heat conductivity substantially the same or higher than the metal sheet 21. An opening 30 may be centrally provided in the member 31 to facilitate centering of the stud 23 within the sleeve 29. The metal member 31 is preferably secured to the sleeve 29 by any suitable means such as a layer or coating of any suitable adhesive 33 applied to the lower edge of the sleeve.

As best seen in Fig. 1, the stud member 23 is held by the chuck means 28 of the welding gun 27, the chuck member 28 being generally coaxial with a ferrule-holding sleeve 34 of the gun. The ferrule 20 is frictionally held by a lower reduced neck 35 of the sleeve 34, and is urged downwardly against the sheet 21 by a spring (not shown) or other means of the gun 27. In the initial step of a spring-urged gun means the gun 27 is pressed downwardly to press the ferrule 20 against the sheet 21, the ferrule being retained in abutment by the aforementioned gun spring, with the protrusion 26 of the stud 23 inserted through the opening 30 of the metal member 31 and in contact with the metal sheet 21.

The welding stud 23 is then backed-off from the sheet 21, to form a gap 54, as indicated in Fig. 2, between the protrusion 26 and the metal facing member 31 and sheet 21. In the use of other gun equipment, the stud may be pre-positioned and spaced from the sheet 21, the gap 54 being formed without backing-off the stud. The stud 23 may in such instance move in only one direction, i.e., downwardly, during the welding operation.

At this time, an electric circuit, indicated at 37, is closed to establish an electric current flowing from the source of electric power 38 to the stud member 23, arcing across the gap 54 to the sheet 21 and to the metal facing 31, which may be connected to the source 38 as by a wire 39. The arcing across the gap 54 results in heating the lower end 22 of the stud member 23, the metal facing 31, and the sheet 21. As the heat builds up, it is absorbed and is diverted by the facing 31, which is of much smaller volume and/or of higher heat conductivity than sheet 21, allowing only a portion of the facing 31 and only the upper portion of the sheet 21 adjacent to the facing 31 to reach a melting point at the time that the lower end 22 and protrusion 26 of the stud member 23 reach their melting point. The electric current of the circuit 37 is then broken, the molten end 22 of the stud 23 is plunged into the molten pool of material of the facing 31 and the upper surface of the sheet 21 and held in this position, indicated in Fig. 3, until the joint cools. The refractory portion of the ferrule is then usually broken off if made of frangible material.

It has been found that by the use of the means described, a welding zone of very high quality is established without the familiar "burn-through" of prior methods. Also, only the immediate portion adjacent the facing 31 is brought to a melting point, leaving the surrounding area of the sheet 21 substantially in its original condition, and leaving any present protective coating substantially intact and uninjured on the sheet 21.

Whereas it is preferable to provide a protrusion 26 at the lower end of the stud member 23, as previously described, its function is primarily to adapt the instant stud to one of the various types of welding guns. The protrusion may be omitted, if desired (see Fig. 5), wherein a stud 23' is shown having a substantially flat lower edge 34, pre-positioned in spaced relationship by any means desired to a metal disc-like facing 36 of a sleeve member 29'. The stud 23' may also be positioned in contact with the facing 36 and then subjected to a sequence of operations, similar to that described in connection with the embodiments of Figs. 1–3 inclusive, by a suitable adaptation of the welding gun. The facing 36 may be bonded to the sleeve 29' as by an adhesive or the like, and may in this instance, be imperforate.

When an electric current is caused to flow from the stud 23 to the sheet 21, an arc is established from the surface 34 of the stud to the metal facing 36. The heat developed melts only a portion of the metal facing 36. The top portion of sheet 21, in contact with the metal facing 36, becomes plastic or molten by heat conduction. Burn-through of the sheet 21 is prevented because the heat resulting from the arc is diverted from the sheet to the metal facing and because of the heat absorption by the metal facing 36 which is outside of the arcing area underneath and outside of the sleeve 29'. At the conclusion of the flow of current, the stud 23 is plunged into the molten mass of the facing 36 and the molten upper portion of the sheet 21, resulting in a weld as illustrated in Fig. 3. The facing 36 is preferably of a lower melting point than the sheet 21, and provides welding material to join the stud 23 to the sheet 21. In some cases the welds between stud and facing and facing and sheet, respectively, do not merge or overlap, but remain as relatively discrete welds between the respective contiguous parts, with a thin discrete layer of facing material between the stud and the sheet.

In Fig. 6, there is shown another embodiment, wherein a cylindrical sleeve 29", of refractory material, is provided with a bore 45 therethrough. A relatively thin metal member 41 is cemented or otherwise fixed to the bottom edge of the sleeve 29", and is provided with a bore 42 extending therethrough, slightly larger than the outer diameter of the lower end 43 of a stud 23. A depending protrusion 44 may be provided to facilitate adjustment of the welding gun, and is backed off as previously described to form an arc during the welding process. In this instance, the arcing mainly takes place between the stud member, or the projection 44 thereof, and the metal sheet 21.

Various methods may be employed to fix the metal facing or metal member to the refractory sleeves, instead of cementing as previously described. For example, in Fig. 7, there is shown a refractory sleeve 46 of cylindrical or other configuration having a relatively thin metal member 47 disposed at the bottom edge thereof, secured to the sleeve 46 as by an upturned flange 48 having a frictional fit with the sleeve. Also, in this figure, a slightly modified form of sleeve is shown, wherein a reduced bore 49 forms an inwardly extending shoulder 50 at the upper end of the sleeve 46. The bore 49 is preferably larger than the lower end of the stud used, having an adequate clearance therewith.

A further form of securing a metal member to a sleeve of refractory material, is illustrated in Fig. 8, wherein the sleeve 51 is provided with a shallow counter-bore 52 in the lower end thereof, providing a friction fit for a metal member 53 seated therein.

Shoulder weld studs are frequently desired, but offer many disadvantages during welding. It is more difficult to weld such a shoulder stud to a thin sheet member because of the increased diameter at the base thereof, requiring a greater amount of heat during the welding process. Also, such studs are costlier to manufacture, requiring expensive machining operations. It is anticipated by this invention that a standard threaded stud, if a thread is desired, can be used with a metal sleeve, such sleeve forming the shoulder of the stud when welded in accordance with this invention. In Fig. 9, a welding stud 55 is illustrated having external threads 56 throughout its length. A projection 57 may depend from the lower end of the stud 55. In this embodiment, a ferrule 58 comprises a sleeve 59, of refractory material, having an elongated metal member or sleeve 61 fixed to the bottom edge thereof. When the stud 55 is spaced to produce an arc during the welding operation, the arcing is effected between the projection 57 and the sheet 21 and between the lower end 62 of the stud and the metal sleeve 61 to form the solidified joint 63, illustrated in Fig. 10, having a shallow penetration in the sheet 21 and joining the stud 55 and the sleeve 61 to the sheet. In this manner, a shoulder 64 is inexpensively produced. In like manner, a shoulder stud may be produced on a heavy plate or the like. It is understood that the metal members 61 depending from the refractory ferrule sleeve 59 may be of various shapes and forms. In each case, the metal member is fused to the stud 55 and workpiece 21 at the weld site or joint 63, thereby forming an integral assembly with the stud upon the workpiece.

In Fig. 11, a slightly modified form of welding stud and ferrule with metal facing is illustrated. The stud 65 in this embodiment is provided with a chamfered end 66 at the lower end thereof. The outer diametrical dimension of the stud 65 is preferably slightly smaller than the inner diameter of the bore 67 of the metal facing 68 secured to the lower edge of a refractory sleeve 69. The chamfer 66 prevents bonding between the stud 65 and the facing 68 at the beginning of the arcing action as the stud is retracted. If such premature arcing should occur, the stud would be short-circuited and be prevented from retracting to form a proper arc. The inner bore 71 of the sleeve 69 is preferably substantially larger than the inner diameter of the bore 67, and the outer diameter of the stud 65, to form a larger welding chamber capable of accommodating more weld metal as described for Figs. 7 and 8.

Heretofore, it has been extremely difficult to weld a welding stud to a thin curved or corrugated sheet member as commonly used overlying a metal plate, without causing a "burn-through" at the weld area. In Fig. 12, a relatively thin corrugated metal sheet 75 is illustrated overlying a metal plate 76 and in contact therewith. The corrugated sheet 75 may comprise a single layer or a plurality of layers of sheet metal, and for the purpose of illustration, a double layered sheet is shown.

In this instant stud welding operation, the sheet 75 forms a small area of contact, indicated at 78, with the plate 76, leaving an air space 77 on each side of the contact area. When an end 81 of a stud 79 is spaced from the sheet 75 and an electric current applied to the stud and sheet as described in the previous embodiments, the resultant arc heats and melts the area 78 of the sheet. As the arcing continues, heat is conducted along the sheet 75.

In prior methods, the build-up of this conducted heat was so great as to cause the area of the sheet 75, above the air spaces 77 and near the area 78, to melt, resulting in holes.

In accordance with this invention, a metal facing 82, secured to the lower surface of a refractory sleeve 83, is brought into contact with the rising walls of the corrugation. The metal facing 82 absorbs heat from the sheet 75, particularly above the air spaces 77, thus preventing the formation of holes in the sheet.

Meanwhile, the heat generated in the area 78 causes the stud to burn through the corrugated sheet until the stud 79 is arcing to the plate 76. Weld metal is deposited from the stud 79 to fill the hole in the corrugated sheet and form the resultant weld as illustrated in Fig. 13. Even though a flat metal facing 82 is used, as illustrated in Fig. 12, the heat of the arc causes the facing to sag and conform to the contour of the sheet 75, as illustrated in Fig. 13, at the conclusion of the welding operation.

It has been found that in welding to a thin gauge material, the refractory sleeve may be relatively unaffected by the heat generated during the arcing action. In most instances, the refractory sleeve is re-usable after separation from the metal facing. Therefore, this invention provides a somewhat permanent ferrule sleeve, preferably with a heavy wall thickness which is highly resistant to heat shock and can be reused for subsequent welding operations by replacing the spent facing, as by clipping, gluing, or otherwise securing a new facing to the ferrule, or optionally, by placing or securing a facing on the sheet and then applying a ferrule, which is held by the welding gun, against the facing.

Referring to Fig. 14, a sleeve 85, similar to the sleeve 29 of Fig. 1, is permanently or semi-permanently fixed in a welding gun sleeve 86. A strip 87 of suitable metal is formed with enlarged portions 88 of a dimension suitable for application between the refractory sleeve 85 and a metal sheet 21 as a weld material to weld a stud 89 to the sheet 21. The strip 87 further includes narrow frangible portions 91 connecting the enlarged portions 88, and apertures 92 centrally located in each enlarged portion 88 if desired. In this embodiment, the strip 87 is advanced to position an enlarged portion 88 in contact with a desired area to be welded. The weld stud 89 and refractory sleeve 85 are lowered by the gun 86 until a projection 93 centers in an aperture 92 in contact with the sheet 21, and the refractory sleeve 85 is in contact with the enlarged portion 88 of the strip. As in the previous embodiments, the stud 89 is withdrawn to form an arc and melt the upper area of a sheet 21, the enlarged portion 88, the protrusion 93, and the lower end of the stud 89. The stud 89 is then plunged into this molten area and held until cooled. If, after this operation, the strip 87 is still attached to the first enlarged portion 88 which has been melted as by the frangible narrow portion 91, it can be readily separated from the enlarged portion by manually breaking it off. The adjacent enlarged portion 88 can then be positioned to another weld zone and the above operation repeated.

In general, this invention provides a means and method for welding a weld stud to metal sheets of extremely thin gauge which have hitherto been very difficult or impossible to accomplish. For example, a ⅜ inch diameter stud can by this method be effectively bonded to a metal sheet having a thickness of 0.020 inch which is less than ⅓ of the minimum thickness as taught by prior methods. This limitation in the past has been due to the way the heat generated in the weld zone has been accumulated in the plate, resulting in the common "burn-through" or destruction of protective coating of the sheet metal.

This invention provides a thin metal facing or element, bonded or placed beneath a ferrule of refractory material, which is commonly used in such applications, to dissipate the heat from the weld zone, sufficiently to prevent a complete penetration of melting temperature through the thickness of the sheet metal, which would melt the sheet metal in the weld zone, and cause a "burn-through." The metal facing bearing against the metal sheet draws heat at a rapid rate away from the weld zone. A metal facing having a substantially equal or higher heat conductivity, such as a copper alloy material or the like, is preferably used. Also, the facing is preferably of a material having a relatively lower melting point. The combined effect of using a material for the facing having a substantially equal or higher heat conductivity and a lower melting point is to prevent the stud from burning through very thin gauge material, yet yielding satisfactory welds even when bonded to a coated material such as a galvanized material. The metal facing remains on the end of the stud member, being fused to both the stud and the sheet members and forming an effective bond.

With this type of ferrule, it has been found that the heat settings are not critical, and a relatively large range of timing values can be used before a given stud size will burn through a given thin sheet size. For instance, when using a variable voltage type D.C. welding generator, open circuit voltages may be increased 15% and arc-timing values may be increased 20% without burning through the material.

It has also been found that in using a metal-faced ferrule as taught by this invention, a very small diameter stud can be welded effectively to a large massive structure, a feat which has been heretofore difficult to achieve. It is believed that the reason such welding has not been successful is because the heat is dissipated from the weld zone too quickly during the weld, the massive structure dissipating the heat so quickly that a quench effect is created and the weld metal becomes relatively hard and brittle. By using a metal-faced ferrule, the heat can be increased, the area of the weld zone can be increased, and the rate of heat dissipation from the weld zone appreciably decreased. Such welds are therefore more ductile and stronger.

The metal facing of the ferrule may be of any suitable material, such as a copper alloy previously mentioned, or an alloy may be chosen which is compatible with two different materials, if the stud and the sheet metal are composed of different materials. For example, in some instances when a steel is welded to an alloy the welds are brittle and weak, because of the formation of martensite, a chief constituent of quenched steel. It is possible by the selection of the facing material as a third alloying element, that such martensite structure may be avoided. More specifically, it is anticipated that a steel stud may be welded as to an aluminum sheet, by using a metal facing which will alloy to the steel stud and to the aluminum, and having an intermediate melting point. Or, the metal facing itself may consist of more than one metal arranged in concentric rings, to alloy and fuse the component parts during the welding operation.

The ferrule herein described may be of any suitable refractory material such as ceramic or metal material which resists fusing, reducing or the like.

An important feature of this invention is that the thin gauge sheet member is brought to a melting point only at the surface adjacent to the facing, leaving the underside or the opposite side intact and uninjured and unchanged. A successful weld by this means and method, is now possible for thin gauge metals, which have hitherto been impractical.

It is understood that wherever the terms "sheet" or "plate" is used in the specification and claims, that the invention contemplates the broader term "workpiece" or "member."

While the instant invention has been shown and described herein in what is conceived to be the most practical and preferred embodiments, it is recognized that departures may be made therefrom within the scope of the invention, which is therefore not to be limited to the details disclosed herein, but is to be accorded the full scope of the claims.

What is claimed is:

1. A ferrule for use in welding a stud to a sheet or plate comprising: a sleeve of refractory material having a passageway therethrough for shielding the stud, and a solid homogeneous metal member at one end face of said sleeve for absorbing heat from the sheet or plate during the welding operation.

2. A ferrule in accordance with claim 1 wherein said metal member comprises a metal facing on said sleeve having a lower melting point than the sheet.

3. In the art of stud welding a stud to a sheet, the combination comprising: a refractory sleeve having a passageway therethrough, and a solid homogeneous metal member adapted to be positioned between the stud and sheet prior to application of an electric welding current, said metal member having a non-ferrous composition and a lower melting point than the sheet and defining with said sleeve a welding chamber.

4. The combination in accordance with claim 3 wherein said metal member comprises a continuous strip having enlarged portions connected by relatively narrow frangible portions, said enlarged portions being used in successive welding operations.

5. A ferrule for use in welding a stud to a plate, said stud and plate being formed of an electric conducting material, comprising: a sleeve of refractory material having a bore therethrough for shielding the stud, and a metal sleeve depending from said refractory sleeve having a bore therethrough larger than said stud, said metal sleeve forming an integral shoulder on said stud following fusing of the stud, metal sleeve and plate by an electric welding current.

6. A ferrule for use in welding a stud to a sheet, said stud and sheet being formed of an electric conducting material, comprising: a sleeve of refractory material having a passageway therethrough larger than the stud, and a solid homogeneous metal member on said sheet and having an upturned annular flange, said sleeve being clamped to said metal member by said flange, whereby said flange defines a shoulder on said stud following fusing of the stud, a portion of said metal member and the sheet by an electric welding current.

7. A ferrule for use in welding a stud to a sheet, said stud and sheet being formed of an electric conducting material, comprising: a sleeve of refractory material having a passageway therethrough larger than the stud and an enlarged bore forming a seat, and a solid homogeneous metal member secured in said seat.

8. A method of welding a stud to an underlying, relatively thin sheet, said stud and sheet being of electric conducting material, comprising the steps of: placing a sleeve of refractory material having a solid homogeneous metal facing around the stud and against said sheet with said metal facing in contact with the sheet, flowing an electric current through said stud, metal facing and sheet, spacing the end of the stud from said metal facing to establish an arc sufficient to melt the end of the said stud, only a portion of said metal facing and the upper surface of said sheet, fusing the upper surface of said sheet by heat conduction from the molten portion of said metal facing, stopping flow of current, driving the end of said stud into the molten portion of said metal facing and upper portion of the plate and holding said end of said stud in said molten metal facing portion while said metal facing cools to solidify the bond.

9. A method of welding a stud to a relatively thin sheet, said stud and sheet being formed of electric conducting material, comprising: placing a sleeve of refractory material having an apertured metal facing against said sheet with said metal facing in contact with the sheet, inserting the stud into said sleeve until a protusion on said stud extends through the aperture of said metal facing and contacts said sheet, flowing an electric current through said stud and sheet, withdrawing the end of the stud from said sheet to establish an arc sufficient to melt the end of said stud, metal facing and the upper surface of said sheet, stopping flow of current and driving the end of said stud into the molten metal facing and top portion of the sheet.

10. A method of welding a stud to a relatively thin sheet, said stud and sheet being of electrical conducting material, comprising the steps of: positioning an elongate metal strip with an enlarged portion thereof in contact with the sheet, placing a sleeve of refractory material around the stud and against said enlarged portion of said strip, spacing the stud from said enlarged portion, flowing an electric current through said stud, metal strip and sheet to establish an arc sufficient to melt the end of said stud, only a portion of said enlarged portion of the strip and the upper surface of said sheet, stopping flow of current, driving the end of said stud into the molten metal, and breaking off the strip at a narrow frangible portion adjacent said enlarged portion.

11. A method of stud welding comprising the steps of: juxtaposing a metal sheet, a fusable member and a welding stud in that order, said sheet and said member and said stud being of electrical conducting material, the stud being encircled by a refractory welding ferrule, flowing an electric current from the stud to the sheet, forming an arc from the stud and fusing only a portion of the fusable member into the stud and a portion of the sheet.

12. In the art of welding, the combination comprising: a metal stud member having a protrusion depending therefrom, a relatively thin metal sheet, a refractory sleeve having a passageway therethrough slightly larger than said stud member, and a metal facing on said sleeve, said facing having an aperture therethrough slightly larger than said protrusion, and being fused between said stud and said sheet when a welding current is established from stud to sheet.

13. In the art of welding, the combination comprising: a cylindrical metal stud member, a relatively thin metal sheet, a refractory sleeve having a passageway therethrough larger than said stud member, and a metal facing on said sleeve, said facing having an aperture therethrough smaller than the diameter of said stud, a substantial portion of said facing being fused between said stud and said sheet when a welding current is established from stud to sheet.

14. A method of welding a stud to an underlying plate, said stud and plate being of electric conducting material, comprising the steps of: placing a sleeve of refractory material and having a metal facing depending therefrom and said facing having a passageway therethrough substantially larger than said stud, around the stud and against the plate with said metal facing in contact with the plate; placing the stud in contact with said plate; flowing an electric current through said stud, and said plate, spacing the end of said stud from said plate to establish an electric arc between said stud and said plate sufficient to melt the end of said stud, only a portion of said metal facing, and an upper portion of said plate, stopping the flow of current, driving the end of said stud into the molten portion of said plate, and holding said metal facing and said stud in contact with said plate until cooled and solidified, thereby forming a collar around said stud.

15. In the art of welding a metal stud to a relatively thin curved metal sheet and a flat metal plate, the curved sheet being juxtaposed to the plate, the combination comprising: a metal stud member, a refractory sleeve having a passageway therethrough larger than said stud and a solid homogeneous metal facing thereon, said facing being larger than said passageway, and being adapted to be positioned around said stud with said facing between said sleeve and the curved sheet and against said sheet prior to the application of an electric welding current, said metal facing having a curved lower surface conforming substantially in configuration to said curved sheet after fusing of said stud to said facing, sheet and plate.

16. In the art of welding a metal stud to a relatively thin curved metal sheet and a flat metal plate, the curved sheet being juxtaposed to the plate, the combination comprising: a metal stud member, a refractory sleeve having a passageway therethrough larger than said stud and a solid homogeneous facing thereon and larger than said passageway, said facing having an aperture therethrough larger than the end of said stud and being curved complementary to said curved sheet for positioning said sleeve and said facing around said stud with said facing between said sleeve and the curved sheet and against said sheet prior to the application of an electric welding current whereby said stud is fused to said facing sheet and plate during the application of an electric welding current.

17. A method of welding a stud to a relatively thin corrugated sheet having an underlying plate, said stud sheet and plate being of electrical conducting material comprising the steps of: placing a sleeve of refractory material having a metal facing around the stud and against said sheet with said metal facing in contact with the sheet, flowing an electric current sufficient to establish an arc between said stud and said underlying plate for melting the end of said stud, only a portion of said metal facing, a portion of said sheet, and the upper surface of said plate, stopping the flow of current, and driving the end of said stud into the molten metal.

18. In the art of welding a stud to a workpiece, the provision of: a ferrule body member of refractory material having a passageway therethrough to receive said stud, said ferrule body member having an end face adapted to be positioned opposite the workpiece; and a metal member at said end face for diverting heat from the workpiece during the welding operation.

19. In the art of welding a stud to a workpiece, the provision of: a ferrule body member of refractory material having a passageway therethrough to receive said stud; and a metal member at one end of the passageway defining with the body member a welding chamber, said metal member being adapted to be positioned at the workpiece.

References Cited in the file of this patent

UNITED STATES PATENTS

| | | |
|---|---|---|
| 2,421,184 | Candy | May 27, 1947 |
| 2,760,797 | Woodling | Aug. 28, 1956 |
| 2,829,235 | Van Den Blink et al. | Apr. 1, 1958 |